(12) United States Patent
Tsao

(10) Patent No.: US 10,164,460 B2
(45) Date of Patent: Dec. 25, 2018

(54) WIRELESS CHARGING DEVICE, WIRELESS CHARGING CASE AND METHOD OF WIRELESS CHARGING WITH FREQUENCY OR POSITION ADJUSTMENT ACCORDING TO DETECTED TEMPERATURE

(71) Applicant: Wistron Corporation, New Taipei (TW)

(72) Inventor: Wen-Chun Tsao, New Taipei (TW)

(73) Assignee: Wistron Corporation, New Taipei (TW)

( * ) Notice: Subject to any disclaimer, the term of this patent is extended or adjusted under 35 U.S.C. 154(b) by 49 days.

(21) Appl. No.: 14/964,589

(22) Filed: Dec. 10, 2015

(65) Prior Publication Data

US 2017/0085116 A1    Mar. 23, 2017

(30) Foreign Application Priority Data

Sep. 21, 2015    (TW) .............................. 104131174 A

(51) Int. Cl.
*H02J 7/00*    (2006.01)
*H02J 7/02*    (2016.01)
(Continued)

(52) U.S. Cl.
CPC .............. *H02J 7/025* (2013.01); *H02J 7/047* (2013.01); *H02J 50/12* (2016.02); *H02J 50/40* (2016.02); *H02J 50/90* (2016.02)

(58) Field of Classification Search
CPC .......... Y02E 60/12; H02J 7/025; H02J 50/12; H02J 7/047; H02J 50/90; H02J 50/40; H01F 38/14; Y02T 90/122; B60L 11/182
(Continued)

(56) References Cited

U.S. PATENT DOCUMENTS

| 5,519,303 A | * | 5/1996 | Goedken | ............... H02J 7/0006 320/150 |
| 6,172,487 B1 | * | 1/2001 | Brotto | ................... H02J 7/0091 320/137 |

(Continued)

FOREIGN PATENT DOCUMENTS

| CN | 103217955 | 7/2013 | |
| CN | 104901436 | 9/2015 | |
| EP | 2579419 A1 * | 4/2013 | ............ H02J 7/0091 |
| JP | 201493921 | 5/2014 | |

OTHER PUBLICATIONS

"Office Action of Taiwan Counterpart Application" with partial English translation, dated Mar. 29, 2016, p. 1-p. 10, in which the listed reference was cited.
(Continued)

*Primary Examiner* — Yalkew Fantu
*Assistant Examiner* — Mohammed J Sharief
(74) *Attorney, Agent, or Firm* — JCIPRNET

(57) ABSTRACT

A wireless charging device, a wireless charging case and a wireless charging method thereof are provided. The wireless charging device includes a wireless signal transmitter, a controller and a temperature sensor. The wireless signal transmitter is configured to transmit an electromagnetic signal. The controller is coupled to the wireless signal transmitter. The temperature sensor is coupled to the controller. The temperature sensor is configured to detect an ambient temperature to obtain a temperature sensing value. The controller controls the wireless signal transmitter to adjust a frequency or a transmitting position of the electromagnetic signal according to the changing state of the temperature sensing value.

13 Claims, 8 Drawing Sheets

(51) Int. Cl.
*H02J 7/04* (2006.01)
*H02J 50/12* (2016.01)
*H02J 50/40* (2016.01)
*H02J 50/90* (2016.01)

(58) Field of Classification Search
USPC .......................................................... 320/108
See application file for complete search history.

(56) References Cited

U.S. PATENT DOCUMENTS

| | | | | |
|---|---|---|---|---|
| 2006/0250233 | A1* | 11/2006 | Powell | G01R 31/3606 340/539.1 |
| 2007/0257642 | A1* | 11/2007 | Xiao | H02J 7/0026 320/134 |
| 2009/0212736 | A1* | 8/2009 | Baarman | H02J 7/0004 320/106 |
| 2010/0328081 | A1* | 12/2010 | Hu | H01M 8/04007 340/586 |
| 2014/0159654 | A1* | 6/2014 | Lee | H02J 7/025 320/108 |

OTHER PUBLICATIONS

"Office Action of Taiwan Counterpart Application" with partial English translation, dated Sep. 9, 2016, p. 1-p. 4.
Office Action of China Counterpart Application, dated Sep. 18, 2018, pp. 1-7.

* cited by examiner

WIRELESS CHARGING DEVICE, WIRELESS CHARGING CASE AND METHOD OF WIRELESS CHARGING WITH FREQUENCY OR POSITION ADJUSTMENT ACCORDING TO DETECTED TEMPERATURE

CROSS-REFERENCE TO RELATED APPLICATION

This application claims the priority benefit of Taiwan application serial no. 104131174, filed on Sep. 21, 2015. The entirety of the above-mentioned patent application is hereby incorporated by reference herein and made a part of this specification.

BACKGROUND OF THE INVENTION

Field of the Invention

The invention relates to a charging device and more particularly relates to a wireless charging device, a wireless charging case and a wireless charging method thereof.

Description of Related Art

With progress in electronic technology, electronic products have become important tools in people's lives. To improve convenience in the usage of electronic products, wireless charging devices are gradually becoming important power transmission modes.

Based on demand for wireless charging, in conventional technology, since a wireless charging device is usually disposed with a communication interface, such that communication between the wireless charging device and an electronic device to be charged is performed using a specific communication protocol. Therefore, this results in an user of the electronic device being unable to perform a charging operation with the wireless charging device and the electronic device by using different charging modes resulting in inconvenience to the user. In addition, since the wireless charging device requires additional configuration of the communication interface of a specific communication protocol, the manufacturing cost of the wireless charging device thus also increases.

SUMMARY OF THE INVENTION

The invention provides a wireless charging device, a wireless charging case and a wireless charging method thereof, which are configured to adjust an electromagnetic signal through detecting an ambient temperature to obtain a temperature sensing value under the premise that configuration of a communication interface is not required.

The wireless charging device includes a wireless signal transmitter, a controller and a temperature sensor. The wireless signal transmitter is configured to transmit an electromagnetic signal. The controller is coupled to the wireless signal transmitter. The temperature sensor is coupled to the controller and is configured to detect an ambient temperature to obtain a temperature sensing value. The controller controls the wireless signal transmitter to adjust a frequency or a transmitting position of the electromagnetic signal according to the changing state of the temperature sensing value.

In an embodiment of the invention, the wireless signal transmitter transmits the electromagnetic signal when the temperature sensing value is higher than a threshold value and the temperature sensing value is lower than a warning value.

In an embodiment of the invention, the controller stops the wireless signal transmitter from transmitting the electromagnetic signal when the temperature sensing value is lower than the warning value and when the magnitude of change of the temperature sensing value falling from a first numerical value to a second numerical value is greater than a preset range.

In an embodiment of the invention, the controller observes whether the temperature sensing value is higher than a warning value according to a slope of change of the temperature sensing value, and stops the wireless signal transmitter from transmitting the electromagnetic signal when the temperature sensing value is higher than the warning value.

In an embodiment of the invention, the wireless signal transmitter includes a magnetic resonance transmitting unit and a switching unit. The magnetic resonance transmitting unit is configured to transmit the electromagnetic signal. The switching unit is coupled between the controller and the magnetic resonance transmitting unit. The controller further produces a controlling signal according to the changing state of the temperature sensing value detected by a temperature sensing unit of the temperature sensor. The magnetic resonance transmitting unit receives the controlling signal and adjusts the frequency of the electromagnetic signal according to the controlling signal.

In an embodiment of the invention, the wireless signal transmitter includes a magnetic induction transmitting unit and a switching unit. The magnetic induction transmitting unit is configured to transmit the electromagnetic signal. The switching unit is coupled between the controller and the magnetic induction transmitting unit. The controller further produces a controlling signal according to the changing state of the temperature sensing value detected by a temperature sensing unit of the temperature sensor. The magnetic induction transmitting unit receives the controlling signal and adjusts the transmitting position of the electromagnetic signal according to the controlling signal.

A wireless charging case of the invention includes a body portion and a wireless charging device. The body portion has a carrier platform. The wireless charging device is disposed in the body portion. The wireless charging device includes a wireless signal transmitter, a controller and a temperature sensor. The wireless signal transmitter is configured to transmit an electromagnetic signal. The controller is coupled to the wireless signal transmitter. The temperature sensor is coupled to the controller and is configured to detect an ambient temperature of the carrier platform to obtain at least one temperature sensing value. The controller controls the wireless signal transmitter to adjust a frequency or a transmitting position of the electromagnetic signal according to the changing state of the temperature sensing value.

A wireless charging method of the invention includes: using a wireless signal transmitter to transmit an electromagnetic signal; using a temperature sensor to detect an ambient temperature to obtain a temperature sensing value; and adjusting a frequency or a transmitting position of the electromagnetic signal according to the changing state of the temperature sensor value.

Accordingly, by way of detecting temperature, the invention adjusts the frequency or the transmitting position of the electromagnetic signal transmitted by the wireless signal transmitter of the wireless charging device, so as to achieve the function of performing charges to various non-specific electronic devices without additional configuration of communication interface required to allow wireless charging operation to be performed between the wireless charging device and the electronic device. Thus, convenience of the product is increased and cost of the product is decreased.

To make the above and other features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
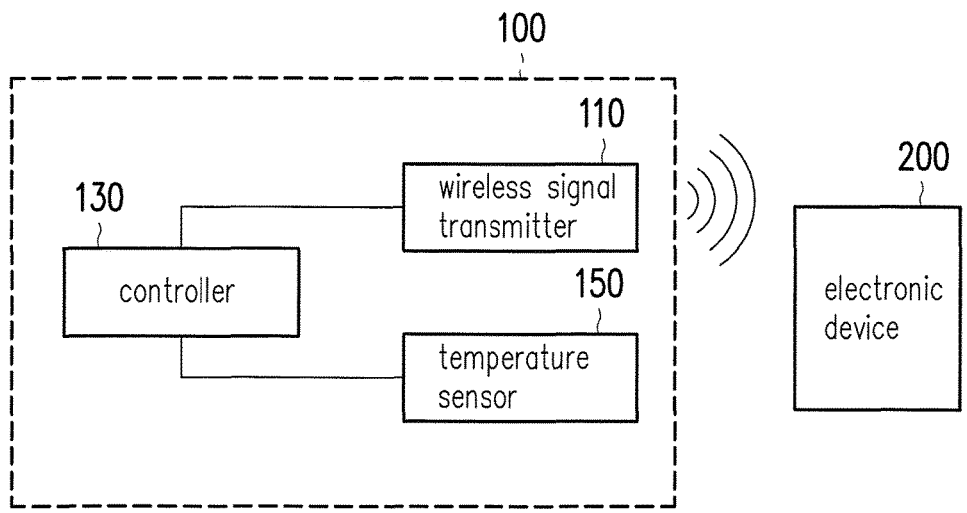
FIG. 1 illustrates a schematic diagram of a wireless charging device of an embodiment of the invention.

Referring to FIG. 1 for the following, FIG. 1 illustrates a schematic diagram of a wireless charging device of an embodiment of the invention. The wireless charging device 100 includes a wireless signal transmitter 110, a controller 130 and a temperature sensor 150. The controller 130 is coupled to the wireless signal transmitter 110 and the temperature sensor 150. In the embodiment, the controller 130 is coupled to the wireless signal transmitter 110 and configured to control the wireless signal transmitter 110 to transmit an electromagnetic signal. When an electronic device 200 is positioned within an electromagnetic signal transmitting range of the wireless signal transmitter 110, the electronic device 200 can receive the electromagnetic signal of the wireless signal transmitter 110 and convert the received electromagnetic signal into a charging signal to perform a charging operation. Since, during the process of the electronic device 200 performing a charge, a wireless signal receiver of the electronic device 200 itself receiving the electromagnetic signal to perform power conversion and performing the charging operation to a rechargeable battery can both result in a temperature in the wireless charging device 100 having different changing states depending on different charging stages of the electronic device 200. Therefore, in the embodiment, the temperature sensor 150 is configured to detect an ambient temperature in the wireless charging device 100 to obtain a temperature sensing value. In addition, the controller 130 adjusts a frequency or a transmitting position of the electromagnetic signal transmitted by the wireless signal transmitter 110 according to the changing state of the temperature sensing value.

Additionally, in the embodiment, the temperature sensor 150 can be a contact temperature sensor or a non-contact temperature sensor. A contact temperature sensor is, for example, a the thermistor, a thermocouple, a resistance temperature detector (RTD), etc., and a non-contact temperature sensor is, for example, an infra red (IR) sensor, etc., but the invention is not limited thereto. Furthermore, in the embodiment, the electronic device 200 can be a cell phone, a personal digital assistant (PDA), a panel PC, a notebook, a smartphone, an MP3 player, or an electronic device, such as a flash drive, capable of executing wireless charging, but the invention is not limited thereto.

Figure 2:
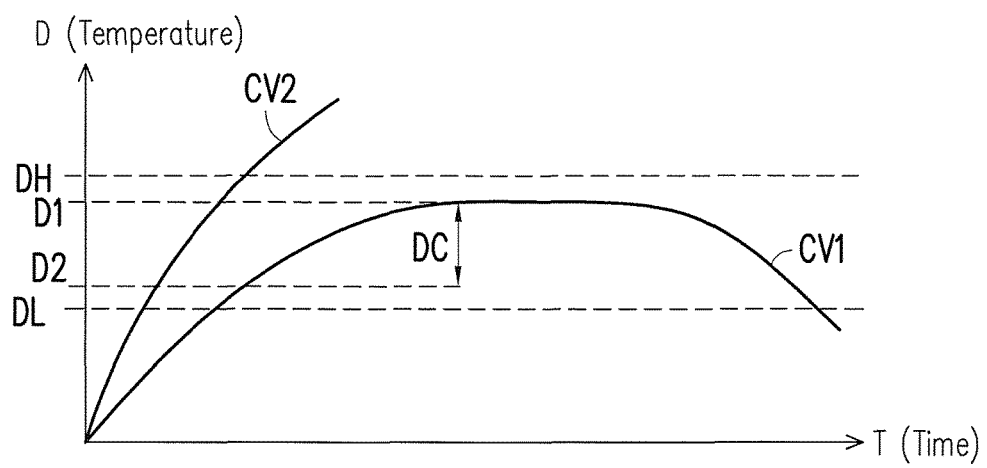
FIG. 2 illustrates a schematic diagram of the changing state of a temperature sensing value of the embodiment in FIG. 1 of the invention.

Referring to FIG. 2 for the following, FIG. 2 illustrates a schematic diagram of the changing state of a temperature sensing value of the embodiment in FIG. 1 of the invention. In the embodiment, when the temperature sensor 150 detects the ambient temperature in the wireless charging device 100 to obtain a temperature sensing value D, the controller 130 of the wireless charging device 100 controls whether the wireless signal transmitter 110 transmits the electromagnetic signal according to the changing state of the temperature sensing value D. For example, in FIG. 2, a temperature change curve CV1 is a change curve of the temperature sensing value D of the electronic device 200 at different charging stages as detected by the temperature sensor 150. At first, since the electronic device 200 begins to receive the electromagnetic signal, the temperature change curve CV1 begins to rise, and rises in a manner of change of a smaller relative slope. Then, the temperature sensing value D is higher than a threshold value DL of charging determination and continues to rise, and the temperature sensing value D changes in a range lower than a warning value DH. Next, since the electronic device 200 begins stable charging operation, after rising to a first numerical value D1, the temperature sensing value D begins to maintain a stable and almost flat curve for a period of time. Finally, since the electronic device 200 is almost completing the charge, the temperature of the electronic device 200 begins to fall from the first numerical value D1. At the same time, the controller 130 determines whether the magnitude of the change of the temperature sensing value D falling from the first numerical value D1 is greater than a preset range DC, allowing the temperature sensing value D to fall from the first numerical value D1 to a second numerical value D2, indicating that the charge is complete. Therefore, the controller 130 controls the wireless signal transmitter 110 to stop transmitting the electromagnetic signal according to this determination.

In other words, in the embodiment, under the circumstance that the temperature sensing value D is lower than the warning value DH and higher than the threshold value DL, the controller 130 determines the electronic device 200 as a rechargeable device, and the wireless signal transmitter 110 continues to transmit the electromagnetic signal. However, under the circumstance that the temperature sensing value D does not exceed the warning value DH and is not higher than the threshold value DL, it indicates that the electronic device 200 may be a non-rechargeable device, or the electronic device 200 has completed the charge, or perhaps even no electronic device 200 is placed within the electromagnetic signal transmitting range of the wireless signal transmitter 110. Therefore, the wireless signal transmitter 110 stops transmitting the electromagnetic signal.

Furthermore, when the electronic device 200 malfunctions or the electronic device 200 is a device incapable of performing a wireless charge or is even another foreign object (for example, objects of metal materials, such as a key), then the temperature sensing value D rises in a manner of change with a relatively larger slope, as shown by a temperature change curve CV2. Therefore, when the temperature sensing value D is higher than the warning value DH, then the controller 130 controls the wireless signal transmitter 110 to stop transmitting the electromagnetic signal. In addition, in other embodiments of the invention, the controller 130 can also decide whether the wireless signal transmitter 110 stops transmitting the electromagnetic signal according to whether the slope of the change curve of the temperature sensing value D exceeds the warning slope value.

Figure 3:
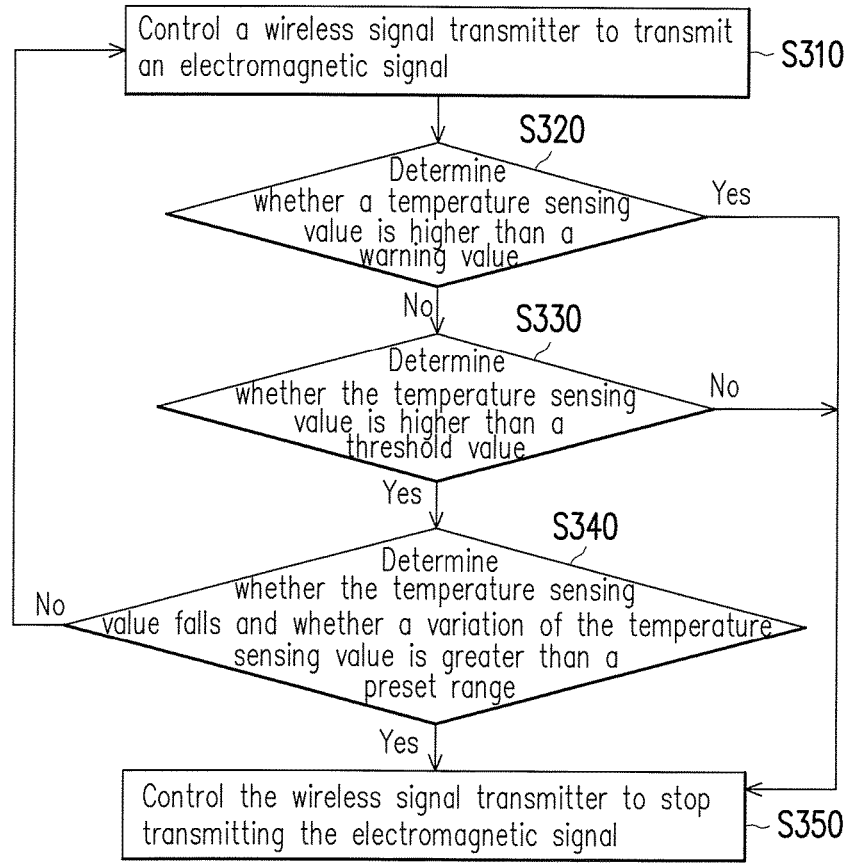
FIG. 3 illustrates a step flow diagram of a controller controlling a wireless signal transmitter of the embodiment in FIG. 1 of the invention.

Referring to FIG. 3 for the following, FIG. 3 illustrates a step flow diagram of a controller controlling a wireless signal transmitter of the embodiment in FIG. 1 of the invention. In step S310, the controller 130 is used to control the wireless signal transmitter 110 to transmit the electromagnetic signal, and the controller 130 receives the temperature sensing value detected by the temperature sensor 150. In step S320, the controller 130 determines whether the temperature sensing value is higher than the warning value. If the temperature sensing value is higher than the warning value, then step S340 is executed. If the temperature sensing value is not higher than the warning value, then step S330 is executed. In step S330, the controller 130 determines whether the temperature sensing value is higher than the threshold value. If the temperature sensing value is not higher than the threshold value, then step S350 is executed. If the temperature sensing value is higher than the threshold value, then step S340 is executed. In step S340, the controller determines whether the temperature sensing value falls and whether the magnitude of the change of fall is greater than the preset range. If no, then step S310 is re-executed. If yes, then step S350 is executed, stopping the controller 130 controlling the transmitter 110 to stop transmitting the electromagnetic signal.

In the embodiment, in the implementation details of each step above, the changing state and determination manner of the temperature sensing value have been thoroughly explained in the embodiments above, and thus are not repeated.

Figure 4:
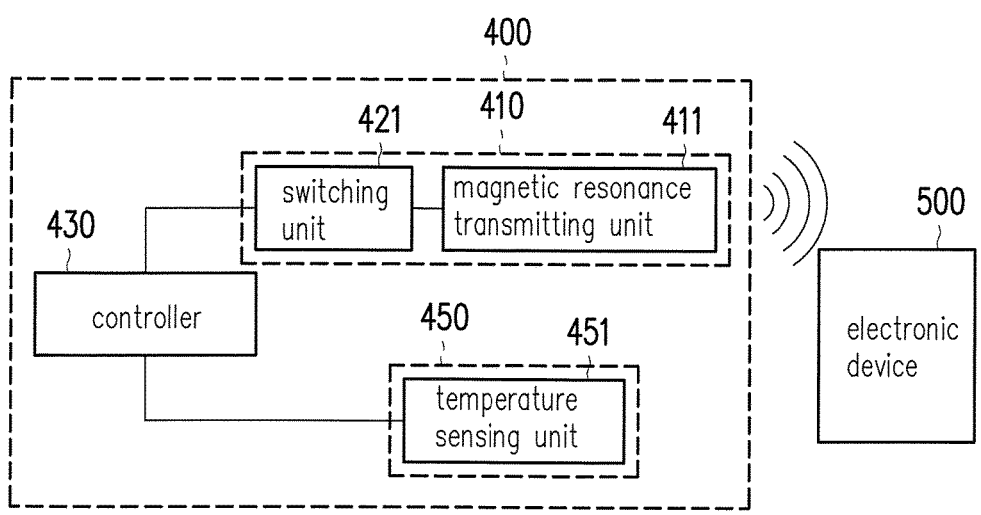
FIG. 4 illustrates a schematic diagram of a magnetic resonance wireless charging device of an embodiment of the invention.

Referring to FIG. 4 for the following, FIG. 4 illustrates a schematic diagram of a magnetic resonance wireless charging device of an embodiment of the invention. A wireless charging device 400 includes a wireless signal transmitter 410, a controller 430 and a temperature sensor 450. In the embodiment, the wireless signal transmitter 410 includes a magnetic resonance transmitting unit 411 and a switching unit 421, and the magnetic resonance transmitting unit 411 is configured to transmit an electromagnetic signal. The temperature sensor 450 includes a temperature sensing unit 451 configured to detect an ambient temperature of a location wherein an electronic device 500 is placed to obtain a temperature sensing value of the electronic device 500. The switching unit 421 is coupled to the controller 430 and the magnetic resonance transmitting unit 411 therebetween. The controller 430 outputs a controlling signal to the switching unit 421 to control the magnetic resonance transmitting unit 411, while the magnetic resonance transmitting unit 411 adjusts a frequency of the electromagnetic signal or shuts down a transmitting operation of the electromagnetic signal according to the controlling signal received.

It is worth noting that in the embodiment, the magnetic resonance transmitting unit 411 is configured to transmit an electromagnetic signal of a specific frequency, and magnetic resonance principles are used to transmit energy, such that a receiving end of the electronic device vibrates at the same frequency. Thus, the magnetic resonance transmitting unit 411 can achieve wireless energy transmission with a more distant transmitting distance. In addition, in the embodiment, the electronic device 500 is a magnetic resonance rechargeable device. Therefore, when the electronic device 500 is placed within an electromagnetic signal transmitting range of the magnetic resonance transmitting unit 411, the electronic device 500 performs a charge corresponding to the electromagnetic signal of the magnetic resonance transmitting unit 411. Here, there are no particular limitations on the number and position of the electronic device 500. As long as the electronic device is disposed within the electromagnetic signal transmitting range, the electromagnetic signal can be received to execute a charging operation.

In the embodiment, the controller 430 further produces a controlling signal according to the changing state of a temperature sensing value detected by the temperature sensing unit 451 of the temperature sensor 450. In addition, the magnetic resonance transmitting unit 411 receives the controlling signal and adjusts the frequency of the electromagnetic signal according to the controlling signal.

Figure 5:
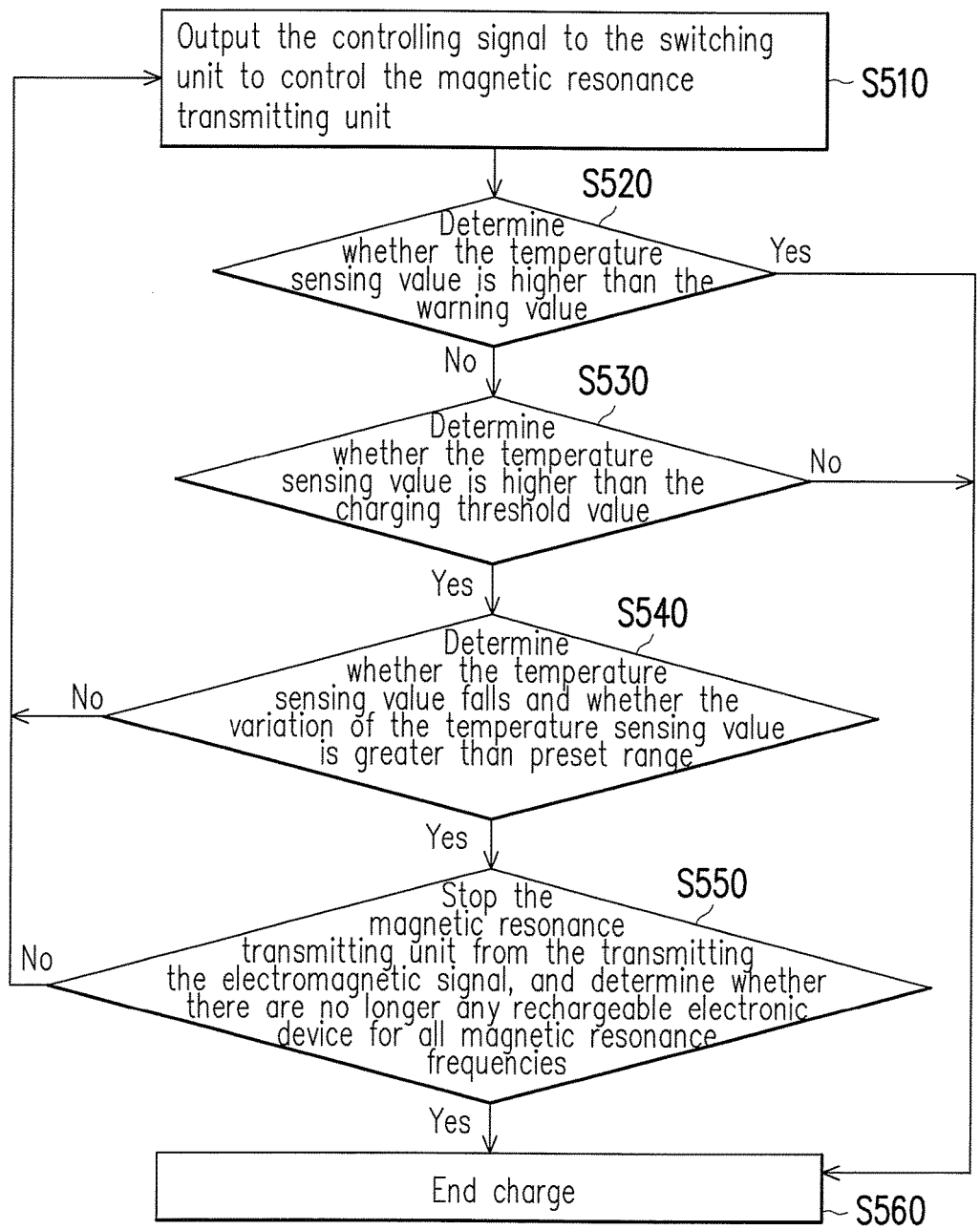
FIG. 5 illustrates a step flow diagram of a controller controlling a magnetic resonance transmitting unit of the embodiment in FIG. 4 of the invention.

Referring to FIG. 5 for the following, FIG. 5 illustrates a step flow diagram of the controller 430 controlling the magnetic resonance transmitting unit 411 of the embodiment in FIG. 4 of the invention. In step S510, the controller 430 outputs the controlling signal to the switching unit to control the magnetic resonance transmitting unit 411 to transmit the electromagnetic signal. In step S520, the controller 430 determines whether the temperature sensing value is higher than a warning value. If the temperature sensing value is higher than the warning value, then step S560 is executed. If the temperature sensing value is not higher than the warning value, then step S530 is executed. In step S530, the controller 430 determines whether the temperature sensing value is higher than a threshold value. If the temperature sensing value is not higher than the threshold value, then step S550 is executed. If higher than the threshold value, then step S540 is executed. In step S540, the controller 430 determines whether the temperature sensing value falls and whether the magnitude of the change of fall is greater than a preset range. If yes, then step S560 is executed. If no, then step S510 is re-executed, and the controller 430 controls the magnetic resonance transmitting unit 411 to continue transmitting the electromagnetic signal. In step S550, the controller 430 stops the magnetic resonance transmitting unit 411 from transmitting the electromagnetic signal and determines whether there are no longer any rechargeable electronic devices for all magnetic resonance frequencies. If there are no longer any rechargeable electronic devices for all magnetic resonance frequencies, then step S560 is executed, ending the charge. In contrast, if in at least one of the magnetic resonance frequencies, there is still a corresponding electronic device that can perform a charge, the controller 430 then adjusts the magnetic resonance frequencies of the magnetic resonance transmitting unit 411, and step S510 is re-executed to perform a charge to an uncharged electronic device.

In the embodiment, in the implementation details of each step above, the changing state and determination manner of the temperature sensing value have been thoroughly explained in the embodiments above, and thus are not repeated.

Figure 6:
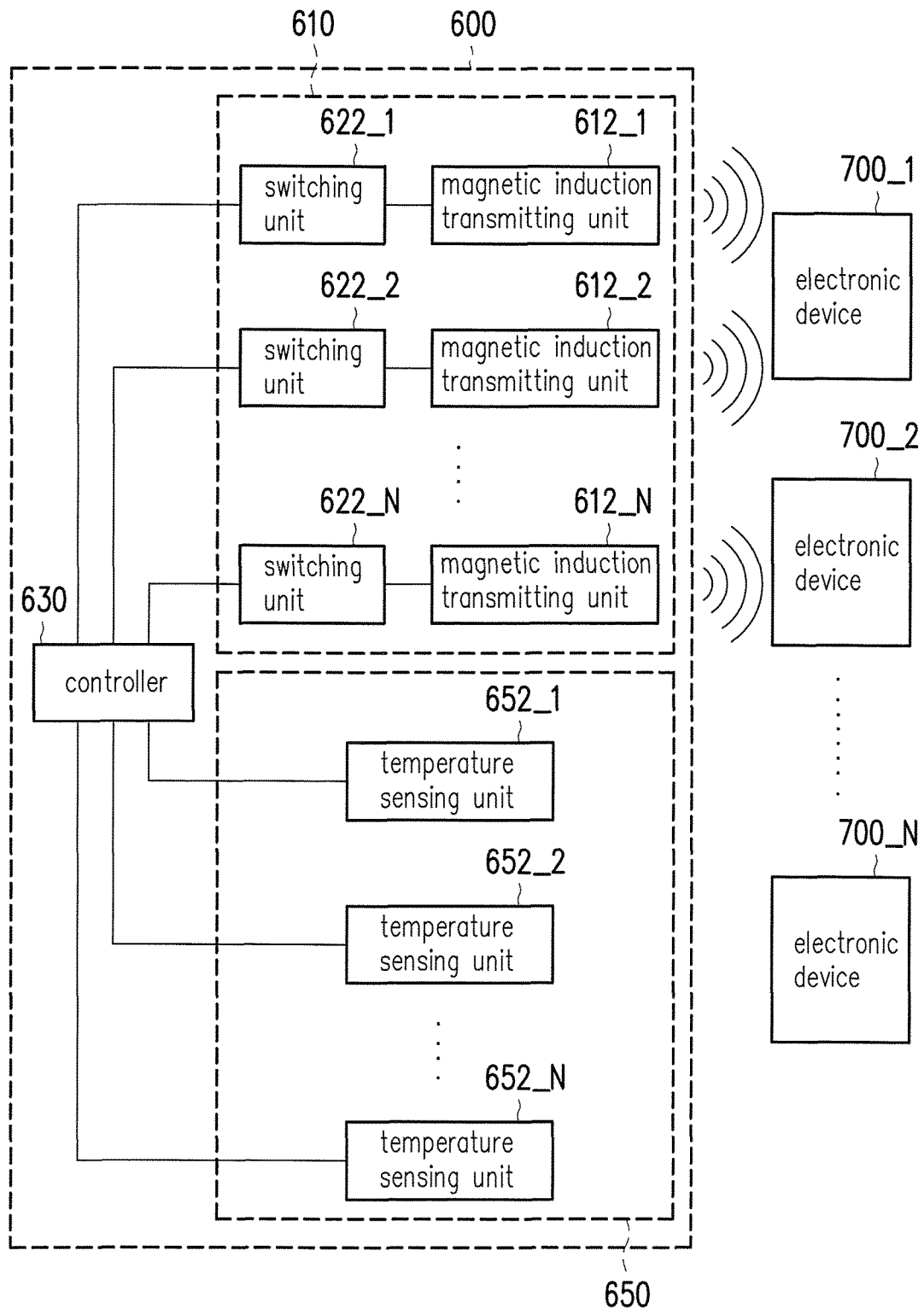
FIG. 6 illustrates a schematic diagram of a magnetic induction wireless charging device of an embodiment of the invention.

Referring to FIG. 6 for the following, FIG. 6 illustrates a schematic diagram of a magnetic induction wireless charging device of an embodiment of the invention. A wireless charging device 600 includes a wireless signal transmitter 610, a controller 630 and a temperature sensor 650. In the embodiment, the wireless signal transmitter 610 includes a plurality of magnetic induction transmitting units 612_1 to 612_N respectively configured to transmit an electromagnetic signal. The temperature sensor 650 includes a plurality of temperature sensing units 652_1 to 652_N configured to respectively detect ambient temperatures of locations wherein a plurality of electronic devices 700_1 to 700_N are placed to obtain a respective temperature sensing value of the electronic devices 700_1 to 700_N. A plurality of switching units 622_1 to 622_N are coupled to the controller 630 and the magnetic induction transmitting units 612_1 to 612_N therebetween. The controller 630 outputs a controlling signal to the switching units 622_1 to 622_N to control whether the magnetic induction transmitting units 612_1 to 612_N transmit the electromagnetic signals. In addition, in the embodiment, N is a positive integer greater than or equal to 1.

It is worth noting that in the embodiment, the magnetic induction transmitting units 612_1 to 612_N are configured to transmit electromagnetic signals of non-specific frequencies, and magnetic induction principles are used to transmit energy, such that receiving ends corresponding to the electronic devices 700_1 to 700_N receive energy through electromagnetic changes. Thus, the magnetic induction transmitting units 612_1 to 612_N must perform wireless energy transmission in a manner of a closer transmitting distance. In addition, in the embodiment, the electronic devices 700_1 to 700_N are magnetic induction rechargeable devices. Therefore, when the electronic devices 700_1 to 700_N are placed respectively close within an electromagnetic signal transmitting range of the magnetic induction transmitting units 612_1 to 612_N, the electronic devices 700_1 to 700_N perform a charge corresponding to the electromagnetic signals of the magnetic induction transmitting units 612_1 to 612_N.

In the embodiment, the controller 630 further produces a plurality of controlling signals according to the changing state of the respective temperature sensing value detected by the plurality of temperature sensing units 652_1 to 652_N of the temperature sensor 650. In addition, the magnetic induction transmitting units 622_1 to 622_N receive the controlling signals and respectively adjust whether the magnetic induction transmitting units 612_1 to 612_N transmit the electromagnetic signals according to the controlling signals, so as to adjust a transmitting position of the electromagnetic signals.

In other words, in the embodiment, according to whether there is a corresponding rechargeable electronic device in the transmitting distance of the electromagnetic signals of the magnetic induction transmitting units 612_1 to 612_N, the controller 630 decides to perform a charge by turning on an individual or a plurality of magnetic induction transmitting units simultaneously.

Figure 7:
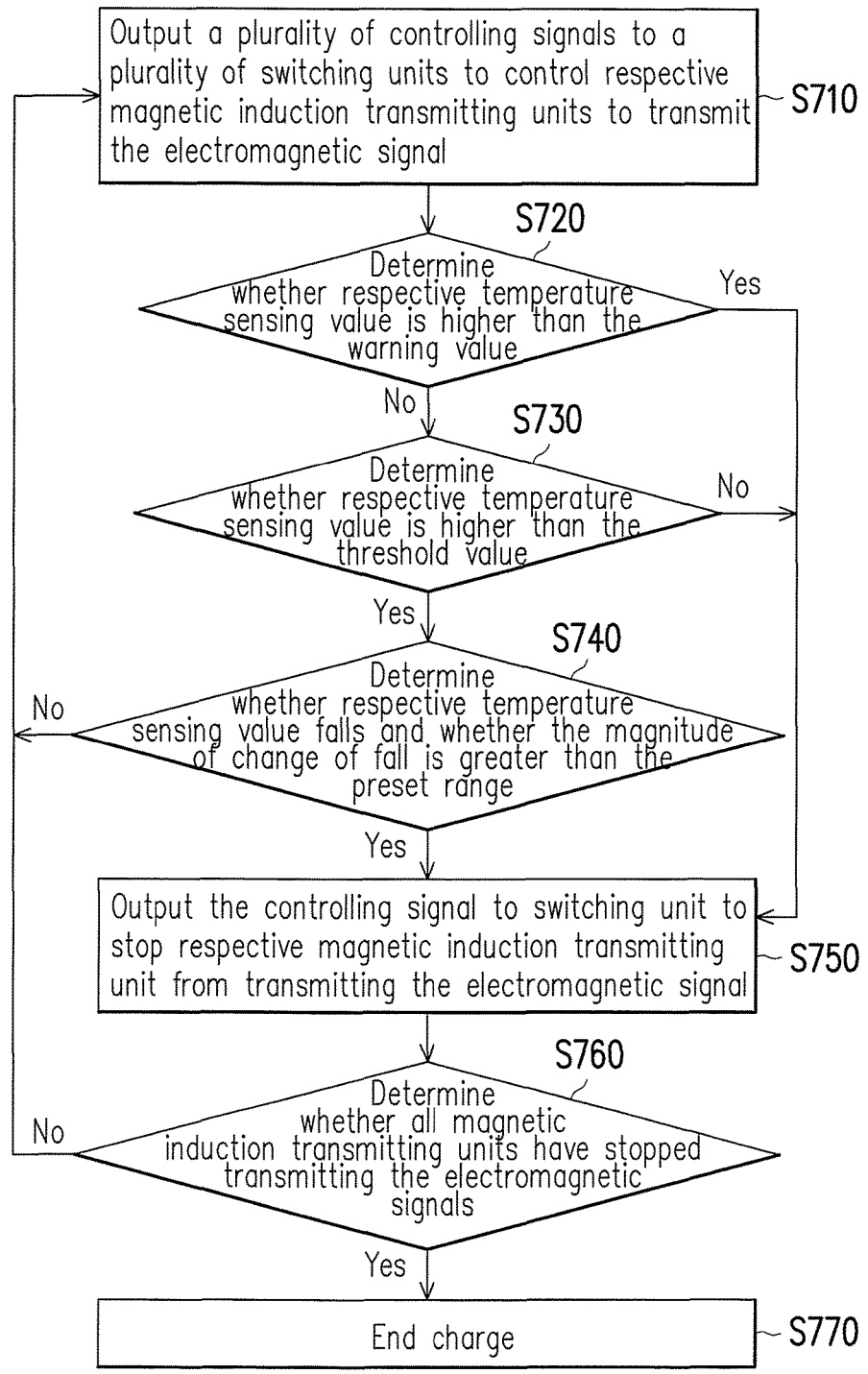
FIG. 7 illustrates a step flow diagram of a controller controlling a magnetic induction transmitting unit of the embodiment in FIG. 6 of the invention.

Referring to FIG. 7 for the following, FIG. 7 illustrates a step flow diagram of the controller 630 controlling the magnetic induction transmitting units 612_1 to 612_N of the embodiment in FIG. 6 of the invention. In step S710, the controller 630 outputs the plurality of controlling signals to the plurality of switching units 622_1 to 622_N to control the magnetic induction transmitting units 612_1 to 612_N to transmit the electromagnetic signals. In step S720, the controller 630 determines whether the respective temperature sensing value is higher than a warning value. If the respective temperature sensing value is higher than the warning value, then the respective magnetic induction transmitting unit executes step S750. If the respective temperature sensing value is not higher than the warning value, the respective magnetic induction transmitting unit executes step S730. In step S730, the controller 630 determines whether the respective temperature sensing value is higher than a threshold value. If the respective temperature sensing value is not higher than the threshold value, then the respective magnetic induction transmitting unit executes step S750. If the respective temperature sensing value is higher than the threshold value, then the respective magnetic induction transmitting unit executes step S740. In step S740, the controller 630 determines whether the respective temperature sensing value falls and whether the magnitude of the change of fall is greater than a preset range. If yes, then step S750 is respectively executed. If no, then the respective magnetic induction transmitting unit re-executes step S710, and the controller 630 controls the respective magnetic induction transmitting unit to continue transmitting the electromagnetic signal. In step S750, the controller 630 outputs a controlling signal to the switching unit to stop the respective magnetic induction transmitting unit from transmitting the electromagnetic signal. In step S760, the controller 630 determines whether all magnetic induction transmitting units have stopped transmitting electromagnetic signals. If yes, it indicates that all electronic devices have complete the charge, and step S770 is executed, ending the charge. If no, then the respective magnetic induction transmitting unit executes step S710 to continue transmitting the electromagnetic signal electronic devices which have not complete the charge.

Figure 8:
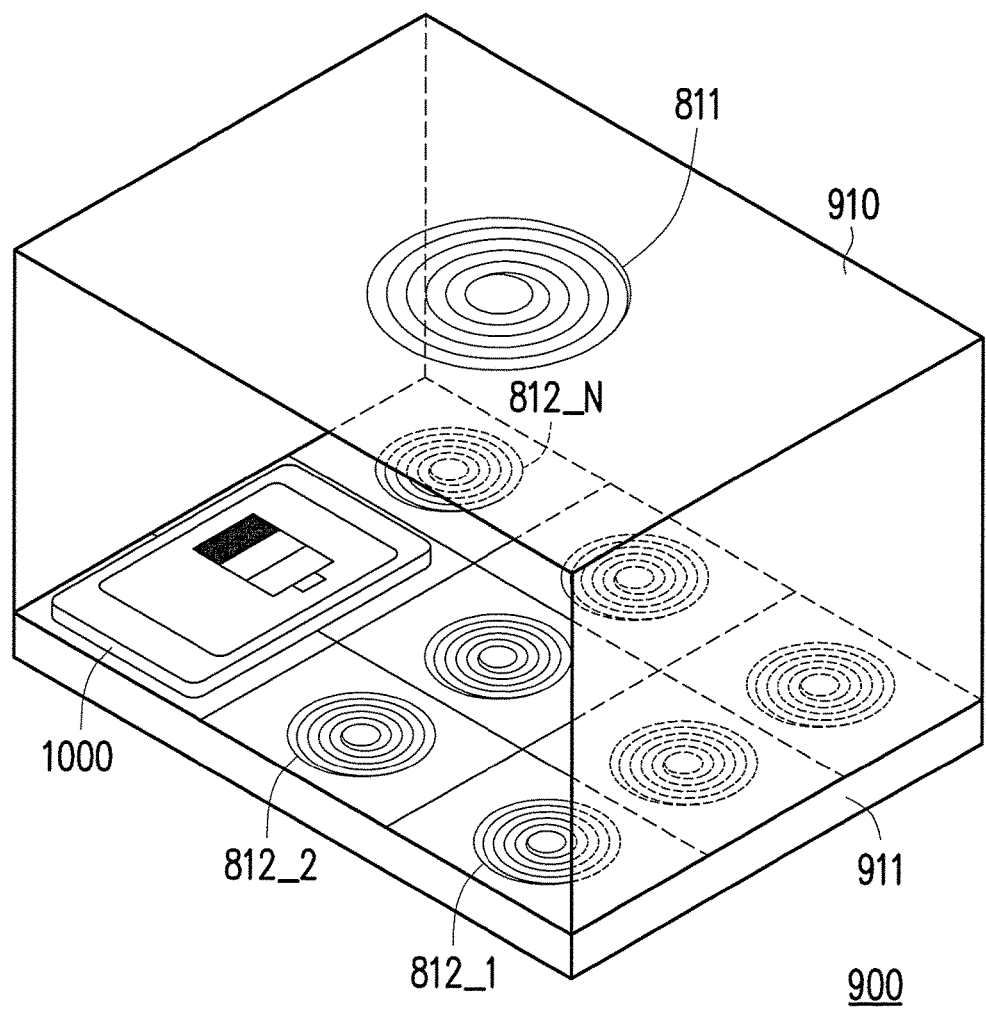
FIG. 8 illustrates a schematic diagram of a wireless charging case of an embodiment of the invention.
Figure 9:
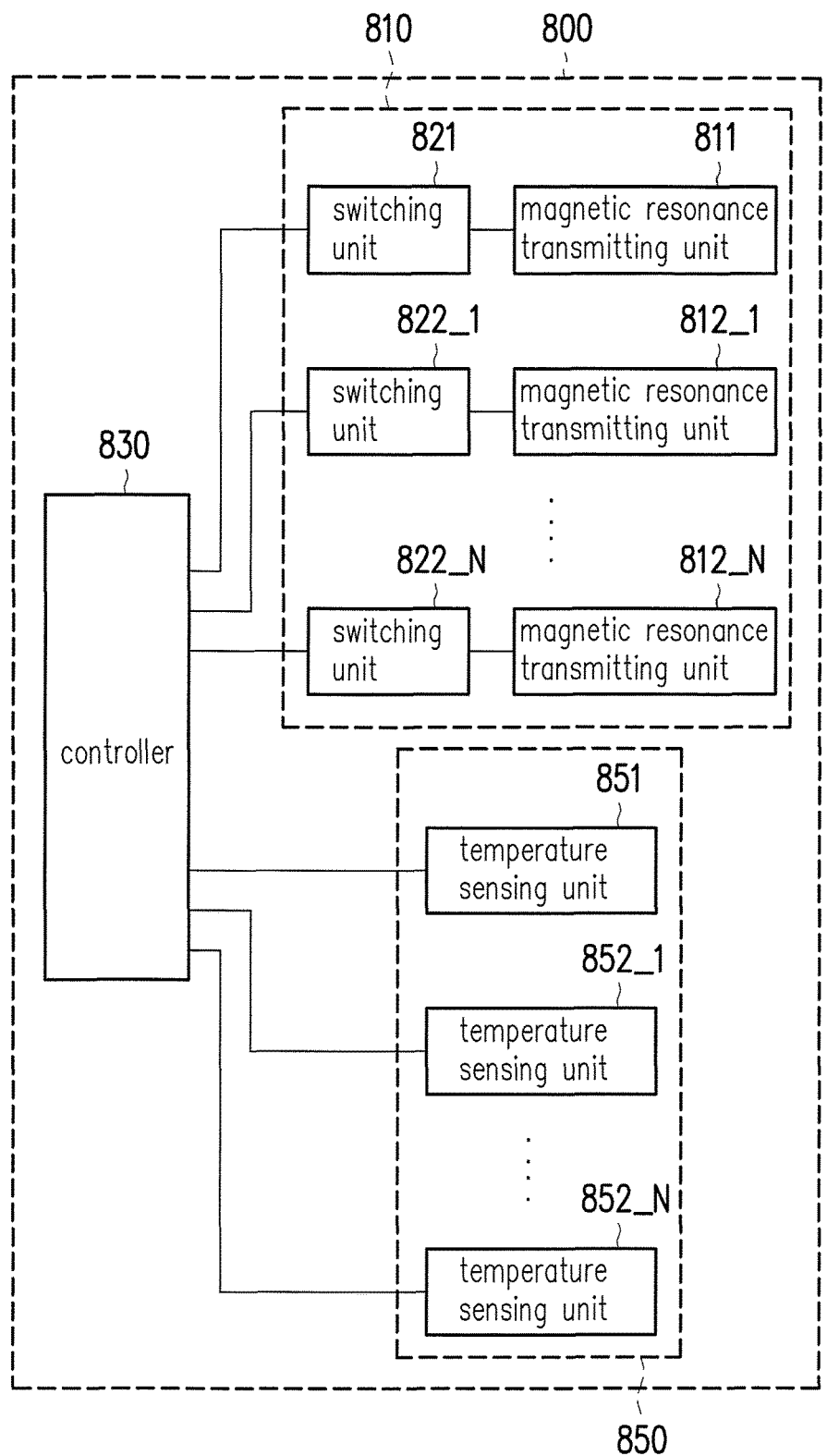
FIG. 9 illustrates a circuit schematic diagram of a wireless charging device of the embodiment in FIG. 8 of the invention.

Referring simultaneously to FIGS. 8 and 9 for the following, FIG. 8 illustrates a schematic diagram of a wireless charging case of an embodiment of the invention. FIG. 9 illustrates a circuit schematic diagram of a wireless charging device of an embodiment of the invention. The wireless charging case 900 includes a body portion 910, and the body portion 910 includes a carrier platform 911. In the embodiment, a wireless charging device 800 is disposed in the body portion 910 of the wireless charging case 900. More specifically, the body portion 910 includes a magnetic resonance transmitting unit 811 configured to transmit an electromagnetic signal to provide surrounding electronic devices to perform in a charging operation. In addition, in the embodiment, the carrier platform 911 further includes a plurality of magnetic induction transmitting units 812_1 to 812_N disposed. Therefore, assuming an electronic device 1000 is a magnetic induction rechargeable device, when the electronic device 1000 is placed at the carrier platform 911, the electronic device 1000 performs wireless charging through at least one of two magnetic induction transmitting units 812_3 and 812_6 corresponding at a close distance. Furthermore, other magnetic induction transmitting units without correspondingly placed electronic devices do not transmit the electromagnetic signals.

In other words, in the embodiment, the wireless charging case 900 simultaneously has the magnetic resonance transmitting unit 811 and the plurality of magnetic induction transmitting units 812_1 to 812_N and uses two charging modes to respectively perform wireless charging to different electronic devices. Furthermore, in the embodiment, a startup sequence of the different charging modes can be first executing a magnetic induction mode and then executing a magnetic resonance mode, or first executing the magnetic resonance mode and then executing the magnetic induction mode, or executing simultaneously, but the invention is not limited thereto.

Furthermore, referring to FIG. 9 for the following, in the embodiment, a temperature sensor 850 further includes a plurality of temperature sensing units 851, 852_1, 852_2 to 852_N configured to respectively perform a sensing to detect a plurality of different electronic devices placed on the carrier platform. In addition, a wireless signal transmitter 810 further includes a plurality of switching units 821, 822_1 to 822_N. Thus, the controller 830 outputs a controlling signal to the switching units 821, 822_1 to 822_N to control whether the magnetic resonance transmitting unit 811 and the magnetic induction transmitting units 812_1 to 812_N transmit the electromagnetic signals. In addition, in the embodiment, N is a positive integer greater than or equal to 1.

In the embodiment, the implementation and device details regarding the wireless charging device, and the changing state and determination manner of the temperature sensing value have been thoroughly explained in the embodiments above, and thus are not repeated.

Figure 10:
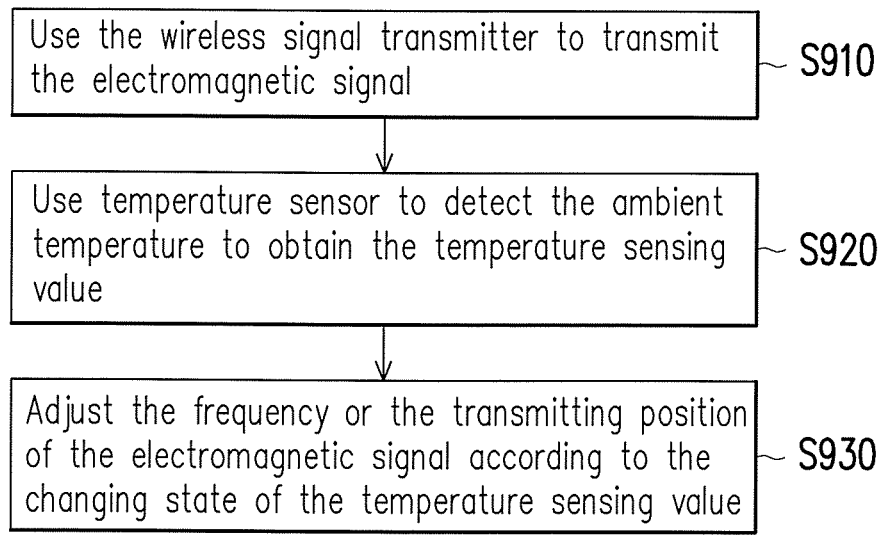
FIG. 10 illustrates a step flow diagram of a wireless charging method of an embodiment of the invention.

FIG. 10 illustrates a step flow diagram of a wireless charging method of an embodiment of the invention. Please refer simultaneously to FIGS. 1 and 10. The wireless charging method of the embodiment is, for example, at least applicable to the wireless charging device 100 of FIG. 1. In step S910, the controller 130 uses the wireless signal transmitter 110 to transmit the electromagnetic signal. In step S920, the controller 130 uses the temperature sensor 150 to detect the ambient temperature to obtain the temperature sensing value. In step S930, the controller 130 adjusts the frequency or the transmitting position of the electromagnetic signal according to the changing state of the temperature sensing value. Thus, the wireless charging device achieves the purpose of wireless charging.

In summary of the above, by way of detecting temperature, the invention adjusts the frequency or the transmitting position of the electromagnetic signal transmitted by the wireless signal transmitter of the wireless charging device, so as to achieve the function of performing charges to various non-specific electronic devices without additional configuration of communication interface required to allow wireless charging operation to be performed between the wireless charging device and the electronic device. In addition, the wireless signal transmitter of the invention includes at least one of two wireless charging modes of the magnetic resonance mode and the magnetic induction mode, so as to perform wireless charging to a device with a plurality of different charging modes or various different charging devices. In addition, the wireless charging device of the invention can be disposed in the wireless charging case, and the wireless charging case is designed to combine with various equipment, furniture, or cabinet, etc., so as to facilitate the use of the wireless charging device at all places to perform a charge to various different electronic devices.

Although the present invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A wireless charging device, comprising:
   a wireless signal transmitter, configured to transmit an electromagnetic signal for charging at least one electronic device;
   a controller, coupled to the wireless signal transmitter; and
   a temperature sensor, coupled to the controller, configured to detect an ambient temperature to obtain a temperature sensing value,
   wherein the controller controls the wireless signal transmitter to adjust a frequency or a transmitting position of the electromagnetic signal according to the changing state of the temperature sensing value and the controller observes whether the temperature sensing value is higher than a warning value according to a slope of change of the temperature sensing value, and stops the wireless signal transmitter from transmitting the electromagnetic signal when the temperature sensing value is higher than the warning value, and
   wherein when the temperature sensing value is lower than the warning value and when the magnitude of change of the temperature sensing value falling from a first numerical value to a second numerical value is greater than a preset range, the controller stops the wireless signal transmitter from transmitting the electromagnetic signal.

2. The wireless charging device according to claim 1, wherein the wireless signal transmitter transmits the electromagnetic signal when the temperature sensing value is higher than a threshold value and the temperature sensing value is lower than the warning value.

3. The wireless charging device according to claim 1, wherein the wireless signal transmitter comprises:
   a magnetic resonance transmitting unit, configured to transmit the electromagnetic signal; and
   a switching unit, coupled between the controller and the magnetic resonance transmitting unit,
   wherein, the controller further produces a controlling signal according to the changing state of the temperature sensing value detected by a temperature sensing unit of the temperature sensor, the magnetic resonance transmitting unit receives the controlling signal and adjusts the frequency of the electromagnetic signal according to the controlling signal.

4. The wireless charging device according to claim 1, wherein the wireless signal transmitter comprises:
   a plurality of magnetic induction transmitting units, configured to transmit a plurality of electromagnetic signals; and
   a plurality of switching units, wherein each of the switching units is coupled between the controller and each of the plurality of magnetic induction transmitting units,
   wherein the controller further produces a plurality of controlling signals according to the changing state of a plurality of temperature sensing values detected by a plurality of temperature sensing units of the temperature sensor, the magnetic induction transmitting units respectively receive the plurality of controlling signals and adjust the transmitting position of the electromagnetic signals according to the plurality of controlling signals.

5. A wireless charging case, comprising:
   a body portion, having a carrier platform; and
   a wireless charging device, disposed in the body portion, the wireless charging device comprising:
   a wireless signal transmitter, configured to transmit an electromagnetic signal for charging at least one electronic device;

a controller, coupled to the wireless signal transmitter; and
a temperature sensor, coupled to the controller, configured to detect an ambient temperature of the carrier platform to obtain at least one temperature sensing value,
wherein the controller controls the wireless signal transmitter to adjust a frequency or a transmitting position of the electromagnetic signal according to the changing state of the temperature sensing value and the controller observes whether the temperature sensing value is higher than a warning value according to a slope of change of the temperature sensing value, and stops the wireless signal transmitter from transmitting the electromagnetic signal when the temperature sensing value is higher than the warning value, and
wherein when the temperature sensing value is lower than the warning value and when the magnitude of change of the temperature sensing value falling from a first numerical value to a second numerical value is greater than a preset range, the controller stops the wireless signal transmitter from transmitting the electromagnetic signal.

6. The wireless charging case according to claim 5, wherein the wireless signal transmitter comprises:
a magnetic resonance transmitting unit, configured to transmit the electromagnetic signal; and
a switching unit, coupled between the controller and the magnetic resonance transmitting unit,
wherein, the controller further produces a controlling signal according to the changing state of the temperature sensing value detected by a temperature sensing unit of the temperature sensor, the magnetic resonance transmitting unit receives the controlling signal and adjusts the frequency of the electromagnetic signal according to the controlling signal.

7. The wireless charging case according to claim 5, wherein the wireless signal transmitter comprises:
a plurality of magnetic induction transmitting units, configured to transmit a plurality of electromagnetic signals; and
a plurality of switching units, wherein each of the switching units is coupled between the controller and each of the plurality of magnetic induction transmitting units,
wherein the controller further produces a plurality of controlling signals according to the changing state of a plurality of temperature sensing values detected by a plurality of temperature sensing units of the temperature sensor, the magnetic induction transmitting units respectively receive the plurality of controlling signals and adjust the transmitting position of the electromagnetic signals according to the plurality of controlling signals.

8. A wireless charging method, comprising:
using a wireless signal transmitter to transmit an electromagnetic signal for charging at least one electronic device;
using a temperature sensor to detect an ambient temperature to obtain a temperature sensing value;
adjusting a frequency or a transmitting position of the electromagnetic signal according to the changing state of the temperature sensor value;
observing whether the temperature sensing value is higher than a warning value according to a slope of change of the temperature sensing value, and when the temperature sensing value is higher than the warning value, stopping transmission of the electromagnetic signal; and
observing whether the temperature sensing value is lower than the warning value and when the magnitude of change of the temperature sensing value falling from a first numerical value to a second numerical value is greater than a preset range, stopping transmission of the electromagnetic signal.

9. The wireless charging method according to claim 8, wherein a step of adjusting a frequency or a transmitting position of the electromagnetic signal according to the changing state of the temperature sensor value comprises:
when the temperature sensing value is higher than a threshold value and the temperature sensing value is lower than the warning value, transmitting the electromagnetic signal.

10. The wireless charging method according to claim 8, wherein a step of transmitting the electromagnetic signal comprises:
using a magnetic resonance transmitting unit to transmit the electromagnetic signal.

11. The wireless charging method according to claim 10, wherein a step of adjusting a frequency or a transmitting position of the electromagnetic signal according to the changing state of the temperature sensor value comprises:
producing a controlling signal according to the changing state of the temperature sensing value detected by a temperature sensing unit of the temperature sensor; and
receiving the controlling signal and adjusting the frequency of the electromagnetic signal according to the controlling signal by the magnetic resonance transmitting unit.

12. The wireless charging method according to claim 8, wherein a step of transmitting the electromagnetic signal directed to the sensing region comprises:
using a plurality of magnetic induction transmitting units to transmit a plurality of electromagnetic signals.

13. The wireless charging method according to claim 12, wherein a step of adjusting a frequency or a transmitting position of the electromagnetic signal according to the changing state of the temperature sensor value comprises:
producing a plurality of controlling signals according to the changing state of a plurality of temperature sensing values detected by a plurality of temperature sensing units of the temperature sensor; and
respectively receiving the plurality of controlling signals and adjusting the transmitting position of the electromagnetic signals according to the plurality of controlling signals by the plurality of magnetic induction transmitting units.

* * * * *